United States Patent Office 3,445,413
Patented May 20, 1969

3,445,413
NITROGEN-CONTAINING ACRYLIC ELASTOMERS STABILIZED WITH INORGANIC PHOSPHITES
August H. Jorgensen, Jr., and Philip H. Starmer, Avon Lake, Ohio, assignors to The B. F. Goodrich Company, New York, N.Y., a corporation of New York
No Drawing. Filed Nov. 14, 1967, Ser. No. 683,000
Int. Cl. C08f 45/72, 45/58, 15/40
U.S. Cl. 260—23
8 Claims

ABSTRACT OF THE DISCLOSURE

Heat-curable acrylate elastomers prepared with an N-substituted alkoxymethyl acrylamide or methacrylamide and lower alkyl esters of acrylic acid are stabilized with inorganic phosphites, particularly when the polymers contain organic acids which enhance the cure. The cured compositions have improved heat aging properties. Another unsaturated amide may be included in the polymer structure. Acids which can be used to enhance the cure include aliphatic and aromatic acids containing 8 to 20 carbon atoms, and representative stabilizers are the hypophosphites and metaphosphites of metals of Groups II-A, II-B and IV-A of the Periodic Table.

Background of the invention

Acrylate rubbers and elastomers comprised of a major proportion of a lower acrylic ester and/or a particular methacrylic ester and minor amounts of an N-alkoxymethyl acrylamide are considered to be self-curing rubbery interpolymers. While such novel rubbery interpolymers yield elastomers which have good physical properties with respect to oil resistance, oil aging, and low temperature flexibility and have good tensile strength, elongation and compression set, when the cure rate is enhanced through the use of certain acidic additives mixed with the self-curing acrylate interpolymers prior to heating to induce the self-curing reaction, the air aging characteristics of such compositions and vulcanizates is less than is desired for many applications. Such materials may harden and lose flexibility on exposure to heat. The usual stabilizers added to elastomers have not been satisfactory in alleviating this problem.

Summary of the invention

Cured elastomers of heat curable acrylic rubbers comprised of a major proportion of a lower acrylic acid ester and/or particular methacrylic acid esters and minor amounts of N-alkoxymethyl acrylamides which have been heated in the presence of an acidic material have greatly improved heat aging properties when such compositions also contain a small amount of an inorganic phosphite.

Detailed description

The rubbery interpolymers are obtained by polymerizing in aqueous emulsion, in solution or bulk, a mixture of monomers comprising (A) one or more rubber-producing lower alkyl esters of acrylic acid or rubber-producing alkyl esters of methacrylic acid and (B) 0.2 to 2.5% preferably of an N-substituted alkoxymethyl acrylamide or methacrylamide, said percent being by weight and based on the total weight of the monomeric mixture. Up to 3.8%, preferably 0.2 to 2.5%, of (C) another monoolefinically and terminally unsaturated amide containing at least one hydrogen on the amide nitrogen and wherein the olefinic unsaturation is α-β to the carbonyl group of the amide and the remainder of the molecule consists only of carbon and hydrogen atoms may also be used, and if so, the total of the (B) and (C) constituents preferably does not exceed about 4%.

The lower acrylic esters embodied in the interpolymers of this invention and comprising the major constituent thereof are those derivatives of acrylic acid represented by the structure

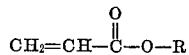

wherein R is a member of the class consisting of alkyl groups having from 1 to 12 carbon atoms, preferably 2 to 8 carbon atoms, the β-cyanoethyl radical and cyanoalkyl groups having from 4 to 12 carbon atoms, preferably 4 to 8. Representative, acyclic, lower alkyl acrylic esters are methyl acrylate, ethyl acrylate, the propyl acrylates, the butyl acrylates, the amyl acrylates, the hexyl acrylates, the heptyl acrylates, the octyl acrylates, e.g., n-octyl and 2-ethylhexyl acrylate, decyl acrylate, and lauryl acrylate; the rubber-producing cyanoalkyl acrylates, the polymers of which have second order transition temperatures not greater than 10° C., such as β-cyanoethyl acrylate having the structure

the α, β and γ-cyanopropyl acrylates, the cyanobutyl acrylates, the cyanoamyl acrylates, the cyanohexyl acrylates, the cyanoheptyl acrylates, and the like. The most preferred acrylic esters in the present invention are ethyl acrylate, butyl acrylate and β-cyanoethyl acrylate.

The rubber-forming, acyclic, methacrylic esters which can be used to replace the above acrylic esters or in mixtures therewith are those derivatives of methacrylic acid represented by the structure

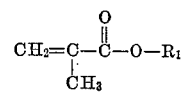

wherein $R_1$ is an alkyl group selected from those containing from 5 to 14 carbon atoms. Suitable methacrylic esters include the amyl, the hexyl, the heptyl, and the octyl methacrylates, decyl methacrylate, lauryl methacrylate and myristyl methacrylate.

The monoolefinically unsaturated amides which are incorporated in the interpolymers of this invention in minor proportions, i.e., 0 to 3.8 weight percent, include acrylamide, methacrylamide, N-methyl acrylamide, N-t-butyl acrylamide, N-cyclohexyl acrylamide, N-ethyl acrylamide and others containing at least one hydrogen on the amide nitrogen. Preferred are amides having the structure

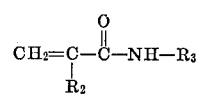

wherein $R_2$ is a member of the group consisting of hydrogen and an alkyl group having from 1 to 4 carbon atoms and $R_3$ is a member of the group consisting of hydrogen and an alkyl group having from 1 to 6 carbon atoms. Most preferred are acrylamide and methacrylamide.

The polymerizable N-alkoxymethyl acrylamides utilized in minor proportions, i.e., about 0.2 to 2.5 percent by weight of the interpolymer, have the structure

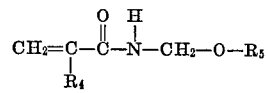

wherein $R_4$ is selected from the group consisting of hydrogen and methyl, and $R_5$ is an alkyl group having from 1 to 8 carbon atoms. It is thus intended that where references are made herein regarding the essential N-substituted alkoxymethyl amides, the term "acrylamide" includes "methacrylamide" within its meaning. The preferred alkoxymethyl acrylamides are those wherein $R_5$ is an alkyl group containing from 2 to 5 carbon atoms and most preferred is N-butoxymethyl acrylamide.

The amount of N-alkoxymethyl acrylamide in the interpolymer is critical. There must be at least 0.2% but if it is present in excess of about 2.5% by weight, the resulting elastomer has inadequate elongation for elastomeric applications. The aforementioned amide component, exemplified by acrylamide and methacrylamide, is also a "reactive monomer" which is included to promote faster curing of the elastomeric interpolymer and also to yield a product having better permanent set. The total of the reactive monomers, that is the amide plus the N-alkoxymethyl acrylamide, preferably should not exceed about 5% of the interpolymer composition. If greater amounts are present, the ultimate elongation of the cured elastomer (vulcanizate) is lowered. 4% maximum is preferred.

The elastomers of this invention have comparatively negligible gel content (indicating relatively little cross-linked structures). Their scorch properties are good, permitting a controllable cure rate. This enables the material to be compounded, molded and cured by conventional processing methods. Excellent high-temperature aging properties in the elastomers having this highly compatible "built-in" cure system are attained when they contain the defined inorganic phosphites.

The monomeric mixture which is polymerized to give the rubbery compositions of this invention may contain a minor amount of one or more other monoolefinically unsaturated monomers copolymerizable with the aforementioned acrylic acid or methacrylic acid ester. Suitable monoolefinically unsaturated monomers contain one

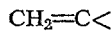

grouping or one —CH=CH— grouping. Representative compounds of this type are the vinyl cyanides such as acrylonitrile, methacrylonitrile, vinylidene cyanide, resin-forming methacrylates such as methyl methacrylate and butyl methacrylate, α-cyano methyl acrylate having the structure $CH_2=CH-COOCH_2CN$, α-cyano ethyl acrylate having the structure

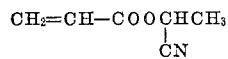

other vinyl and vinylidene monomers such as vinyl chloride, vinylidene chloride, styrene, the vinyl ethers, the vinyl esters, vinyl pyridine, ethylene, propylene, acrylic acid, methacrylic acid, maleic, fumaric, and itaconic acids and their alkyl esters, and the like.

The amount of these optional, copolymerizable, monoolefinically unsaturated monomers which may be used in the recipe is generally less than 40 percent by weight of the monomeric mixture and ordinarily is less than 20%. If it is desired to employ such a comonomer with the acrylic ester to modify certain physical characteristics of the acrylate rubber such as hardness or high temperature performance, the amount thereof should be limited since the polymeric products of the comonomers generally are of a resinous nature. The maximum amount permitted is governed by the effect of said comonomer on the "glass temperature" of the interpolymer.

The temperature at which a polymer changes from a rubbery solid to a brittle substance (the "glass" state), i.e., when it will not tolerate appreciable deformation without fracture, is usually referred to as the "second-order transition temperature" or "glass temperature," and generally is designated by the symbol Tg. The acrylate interpolymer rubbers of this invention have a glass temperature not above about 10° C., preferably at least 0° C. and below, and the glass temperature may range to as low as −70° C.

The acidic materials which may be used in the elastomer to enhance the cure are preferably organic acids which have boiling points greater than 100° C. and preferably greater than 150° C. Such organic materials may either be in the form of the free acid or in the form of derivatives or compounds which generate or release acid groups during the curing reaction. Preferably, the organic compounds contain carboxyl or sulfonic acid groups or precursors thereof. Typical examples of such materials containing carboxyl groups which have been found useful are stearic acid, lauric acid, palmitic acid, benzoic acid, phthalic acid, isophthalic acid, terephthalic acid, salicylic acid, mixtures, and the like. Preferred are aromatic acids or aliphatic acids containing 8 to 20 carbon atoms, both mono- and polycarboxylic acids can be used. Anhydrides such as phthalic anhydride and maleic anhydride may be used as well as acid salts which decompose at temperatures greater than 100° C. The other major group of organic acid curing aids are sulfonic acids or precursors thereof such as the sulfonates or sulfones; for example, toluene sulfonic acid, butadiene sulfone, morpholinium toluene sulfonate, benzene sulfonic acid, naphthalene sulfonic acid and the like. Although they are not as desirable as the organic acids, the acidic carbon blacks or acidic clay fillers which are well known may be used as curing aids. Such carbon blacks or clay fillers have a pH below about 5.

The amount of organic acid curing aid employed on a weight basis is from about 0.05, preferably 0.1, to about 3 to 5 parts per 100 parts by weight of rubber or elastomer and is added along with any other compounding agents in conventional rubber mixing equipment.

The inorganic phosphites useful in the practice of the invention may be used in amounts from greater than about 0.1 to about 5 or more parts by weight per 100 parts by weight of acrylate elastomer. While large amounts may be used they are not necessary and a useful range is from about 0.5 to about 3 parts. The inorganic phosphites can be added to the acrylate elastomers during manufacture, for example, by stirring into a latex of the acrylate elastomer before coagulation or they may be added before, during or after compounding on a mill, in an internal mixer as a Banbury, in a mixer extruder and the like. Concentrated solution or dispersion, or finely divided powder forms of the inorganic phosphite are preferred.

We have found that metal phosphites of Groups I–A, II–A, II–B, IV–A and VIII of the Periodic Table are effective. Better results are obtained through the use of polyvalent metal hypophosphites or metaphosphites of Groups II–A, II–B and IV–A, particularly the phosphites of tin, lead and barium. Examples of such materials are barium hypophosphite, calcium hypophosphite, iron hypophosphite, lead metaphosphite, magnesium hypophosphite, manganous hypophosphite, nickel hypophosphite, strontium phosphite, cadmium phosphite, zinc hypophosphite and the like. Other useful materials, include potassium hypophosphite, sodium hypophosphite, calcium orthophosphite, cobalt orthophosphite, copper orthophosphite, lead orthophosphite, magnesium orthophosphite, manganous orthophosphite, potassium mono- and diorthophosphite, sodium orthophosphite and the like.

The rubbery compositions are obtained by polymerizing the aforedescribed monomeric materials in an inert liquid medium, e.g., in aqueous emulsion or in solution or in bulk. The polymerization system preferably contains a free radical catalyst which may be of either the water-soluble type or the monomer-soluble class. Suitable free-radical initiators include the persulfates, the peroxides, hydroperoxides, azo compounds, the redox catalyst system and the like. The preferred catalysts for the aqueous systems are the well known redox systems, while the preferred catalysts for solution systems are organic peroxides. The free radical catalyst concentration ranges from about 0.01 to 0.2 part per 100 parts by weight of monomers with from about 0.05 to 0.1 part being most preferred.

Aqueous emulsion techniques have been used to prepare the polymers of this invention. The reaction mixtures contained on the order of about 80 to 150 parts of water and about 0.1 to 2.5 parts of a conventional emulsifying agent per 100 parts by weight of monomers. The pH of the system generally was about 7.5 and below. The emulsifiers may be anionic, cationic or nonionic; however, the anionic type is preferred, for example, sodium lauryl sulfate, sodium alkyl naphthalene sulfonate and the like. Representative cationic emulsifying agents include the long chain quaternary salts such as cetyltriethylammonium chloride, the alkyl dimethylbenzylammonium chlorides, and the like. Nonionic emulsifiers include for example, the polyoxyethylene fatty alcohol ethers, polyglycol fatty acid esters, polyoxyethylene modified fatty acid esters and the like.

Suitable solvents for solution polymerization are tert-butyl alcohol, chlorobenzene, carbon tetrachloride, acetone, cyclohexane, benzene, ethyl acetate, toluene, methyl ethyl ketone and others with low chain transfer constants.

Conventional polymerization operating procedures may be used in the production of the interpolymers, either the batch-charging technique or the continuous technique.

The emulsion system reaction temperature may be within the range of 0 to 100° C., with from about 20 to about 40° C. being preferred. The preferred temperature for a solution polymerization is within the range of about 20 to 70° C.

It is economically desirable to carry the polymerization to a 90 to 100% conversion. In the emulsion system from about 2 to 10 hours are required to attain such yields, and in the solution system from 2 to 24 hours of reaction time are necessary, depending on catalyst concentration and temperature. Despite the longer reaction period normally required, the solution polymerization method is sometimes preferred over the emulsion method because there is better distribution in the interpolymer of any monomer constituents having measurable water solubility and the "solution elastomers" are also relatively less corrosive.

Subsequent to polymerization, the rubber is separated from the diluent by freeze coagulation or by agglomeration with a conventional coagulating reagent followed by filtration. The inorganic phosphite may be added before or during this step.

While the defined polyacrylate rubbers are heat-curable, improved vulcanization is brought about by heating the interpolymer in admixture with the acid catalyst. The curing reaction is not uncontrollably fast and the rate can be controlled to a large extent by adjusting the cure temperature (250 to 450° F.) and/or the strength and amount of the acid catalyst. Acid catalyst concentration is generally from about 0.1 to 5 parts per 100 parts by weight of rubber and when no catalyst is present, the rate of cure is slower.

The raw polymer is compounded with the curing catalyst and inorganic phosphite and other rubber compounding agents such as fillers, pigments, lubricants and the like in a conventional rubber mixing apparatus such as a roll-mill or Banbury mixer operated at from about 70 to 250° F.

A heat-curable acrylate elastomer prepared by polymerizing together 82.8 parts of n-butyl acrylate, 15 parts of 2-cyanoethyl acrylate, 1.2 parts of N-butoxymethyl acrylamide and 1.0 part of acrylamide was compounded in the following recipes:

|  | (1) | (2) |
| --- | --- | --- |
|  | Weight, parts | |
| Polymer | 100 | 100 |
| Carbon black [1] | 65 | 65 |
| Stearic acid | 1.0 | 1.0 |
| Dibasic lead phosphite | 0 | 2.0 |
| Phthalic anhydride | 1.5 | 1.5 |

[1] Fast extrusion furnace black.

Samples were cured for 10 minutes at 338° F. and tempered for 3 hours at 347° F. The following test results were obtained on the vulcanizates:

| | | |
| --- | --- | --- |
| Modulus 100% (p.s.i.) | 830 | 830 |
| Tensile (p.s.i.) | 1,390 | 1,390 |
| Elongation (percent) | 160 | 170 |

Samples of the vulcanizates were then heated for 70 hours in air at 347° F. in a tube. The following test results were obtained on the samples.

| | | |
| --- | --- | --- |
| Tensile (p.s.i.) | 890 | 1,380 |
| 180° bend test | Fail | Pass |

The 180° bend test was conducted by bending an aged sample over a mandrel. The failure of the aged vulcanizate which did not contain dibasic lead phosphite demonstrates, in addition to loss in tensile strength and other physical properties, a hardening of the vulcanizate so that it is no longer flexible when it does not contain the inorganic phosphite.

When the above example is repeated with a heat-curable interpolymer containing 98% ethyl acrylate, 1% N-butoxymethyl acrylamide and 1 part of methacrylamide containing dibasic lead phosphite, a cured polymer is obtained which passes the 180° bend test after aging. When the example is repeated with another interpolymer containing about 1% of N-ethoxymethyl acrylamide and about 1.5 parts of acrylamide, and vulcanizates prepared, such vulcanizates containing the phosphite will pass the 180° bend test after aging while vulcanizates which do not contain the inorganic phosphite will not. When the example above is repeated with butadiene sulfone in place of stearic acid, vulcanizates with equivalent physical properties are also obtained.

When these examples are repeated with barium phosphite and calcium phosphite improvement in heat aging is also obtained.

We claim:

1. A composition comprising (1) an interpolymer comprising (A) a major proportion of at least one acrylate rubber producing acrylic ester and (B) a minor proportion of an N-substituted alkoxy alkyl acrylamide, (2) from about 0.1 to less than 10 parts by weight, per 100 of (1), of an organic acid selected from the group consisting of aromatic carboxylic acids and anhydrides thereof, sulfonic acids, fatty acids containing 12 to 18 carbon atoms and butadiene sulfone and (3) a stabilizing amount of an inorganic phosphite.

2. A composition of claim 1 comprising (1) a rubbery interpolymer comprising (A) a major proportion of an alkyl acrylate of the formula

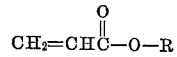

where R is selected from the group consisting of alkyl groups containing 2 to 8 carbon atoms, β-cyanoethyl and cyanoalkyl groups containing from 4 to 8 carbon atoms, (B) from 0.2 to 2.5% by weight of an N-substituted alkoxy methyl acrylamide of the formula

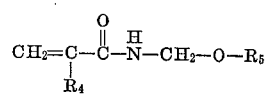

wherein $R_4$ is hydrogen or methyl and $R_5$ is an alkyl group containing 2 to 5 carbon atoms– and (C) from 0 to 3.8% by weight of an amide of the formula

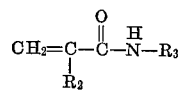

where $R_2$ is hydrogen or methyl and $R_3$ is an alkyl group containing from 1 to 6 carbon atoms, wherein the total of (B) and (C) present in the interpolymer does not exceed about 4 weight percent, (2) about 0.1 to about 5 parts by weight, per 100 of (1), of an organic acid selected from the group consisting of aromatic carboxylic acids and anhydrides thereof, sulfonic acids, fatty acids containing 12 to 18 carbon atoms and butadiene sulfone and (3) from greater than 0.1 to about 5 weight parts of a polyvalent metal phosphite.

3. The composition of claim 2 wherein (A) is an alkyl acrylate wherein the alkyl radical contains 1 to 4 carbon atoms, (B) is N-butoxymethyl acrylamide, (C) is selected from the group consisting of acrylamide and methacrylamide present in amount from 0.2 to 2.5 weight percent and (3) is a metal hypophosphite of Groups II-A, II-B and IV-A of the Periodic Table.

4. The composition of claim 1 heated to a temperature of about 250° F. to about 450° F. to provide a vulcanized product.

5. The composition of claim 2 heated to a temperature of about 250° F. to about 450° F. to provide a vulcanized product.

6. The composition of claim 3 heated to a temperature of about 250° F. to about 450° F. to provide a vulcanized product.

7. The composition of claim 3 wherein the metal is lead.

8. The composition of claim 2 wherein the phosphite is dibasic lead phosphite.

References Cited

UNITED STATES PATENTS

| | | | |
|---|---|---|---|
| 3,228,898 | 1/1966 | Illing et al. | 260—18 |
| 3,315,012 | 4/1967 | Jorgensen et al. | 260—851 |
| 3,326,868 | 6/1967 | Tucker | 260—80.73 |

DONALD E. CZAJA, *Primary Examiner.*

R. A. WHITE, *Assistant Examiner.*

U.S. Cl. X.R.

260—45.7, 80.73, 86.1, 41, 78.4, 79.5, 45.75